United States Patent [19]

Shiraki et al.

[11] Patent Number: 4,757,222

[45] Date of Patent: Jul. 12, 1988

[54] 1-PHASE ENERGIZED DISK-TYPE BRUSHLESS MOTOR

[75] Inventors: Manabu Shiraki, Yamato; Osami Miyao, Sagamihara, both of Japan

[73] Assignee: Shicoh Engineering Co., Ltd., Kanagawa, Japan

[21] Appl. No.: 905,309

[22] Filed: Sep. 9, 1986

[30] Foreign Application Priority Data

Jul. 11, 1984 [JP] Japan .............. 59-168023

[51] Int. Cl.⁴ ........................... H02K 11/00
[52] U.S. Cl. ................... 310/68 B; 310/156; 310/181; 310/268; 310/DIG. 6; 310/138; 310/254
[58] Field of Search .............. 310/268, 68, 67 R, 181, 310/188, 185, 218, 62, 63, 179, 184, 68 R, 68 B, 180, 156, DIG. 6; 318/254, 254 R, 138; 324/208

[56] References Cited

U.S. PATENT DOCUMENTS

| | | | |
|---|---|---|---|
| 3,840,761 | 10/1974 | Müller | 310/268 X |
| 4,115,715 | 9/1978 | Muller | 310/68 B |
| 4,554,473 | 11/1985 | Müller | 310/67 |
| 4,642,496 | 2/1987 | Kerviel | 310/68 B |
| 4,704,566 | 11/1987 | Hirano | 310/156 |

Primary Examiner—R. Skudy
Attorney, Agent, or Firm—Wegner & Bretschneider

[57] ABSTRACT

A 1-phase energized disk-type brushless motor or fan motor comprises a single position detecting element located at a position on a printed circuit board corresponding to one of magnetically active conductor portions of one of stator coils of the stator armature. The magnetically active conductor portions include a width substantially equal to the width of each pole of the magnet rotor. A cogging generating magnetic member or plate having a width substantially equal to the pole width is located on the printed circuit board such that it is spaced by about three fourths of the pole width from one of the conductor portions of one of the stator coils so that the magnet rotor may stop with one pole thereof just opposed to the magnetic member, thereby assuring self-starting of the motor and uniform turning torque over the entire rotation of the motor.

5 Claims, 6 Drawing Sheets

1-PHASE ENERGIZED DISK-TYPE BRUSHLESS MOTOR

BACKGROUND OF THE INVENTION

1. Field of the Invention

This invention relates to a 1-phase energized disk-type brushless motor having a single position detecting element.

2. Description of the Prior Art

As various systems have been developed, brushless motors have been in demand, especially disk-type brushless motors suitable for use with such systems. Disk-type brushless motors can be used as disk-type brushless fan motors which are widely used in office machines and the like. In some applications, these disk-type brushless fan motors are required to be very inexpensive, small and very flattened, setting aside the rotational efficiency (naturally, however, the rotational efficiency must be higher than a particular level in order that they may be of practical use as such).

Those motors which meet the requirements best are 1-phase energized disk-type brushless motors which include a single armature coil and a single position detecting element. However, such a 1-phase energized disk-type brushless motor limited to the above construction cannot actually operate as a motor because it cannot be rotated continuously, although the magnet rotor can turn over a predetermined range. Otherwise, even if a motor having a single armature coil and a single position detecting element can rotate continuously, the single armature coil could not provide a sufficiently large turning force. Therefore, for a sufficient turning force, two or more armature coils must necessarily be provided.

A disk-type brushless motor having two armature coils for a stator armature normally requires two or more position detecting elements. In most cases, magnetoelectric transducers such as Hall elements or Hall ICs (integrated circuits) are used for the position detecting elements. However, since such position detecting elements are expensive, it is desirable for a motor to include, if possible, only one position detecting element in order that inexpensive, small disk-type brushless motors can be mass produced. However, such a motor having a single position detecting element has a drawback that it cannot start itself if the position detecting element detects a boundary between the N (north) pole and the S (south) pole of the magnet rotor, that is, a dead point, similarly as in a motor having a single coil as described above. In this way, a 1-phase motor has a dead point at an energization switching point at which the motor provides zero or no torque. Therefore, the 1-phase motor has a drawback that it cannot start itself if the rotor position upon starting the motor is just at a dead point.

Accordingly, a 1-phase motor is normally provided with a cogging generating magnetic member (an iron piece is used therefor) for generating a torque (cogging torque) in addition to a torque generated by an armature coil and a field magnet (rotor magnet) in order to eliminate such dead points to allow self-starting of the motor.

In a coreless motor, for example, following methods for generating a cogging torque are known. Referring first to FIG. 1, a 6-pole field magnet 2 having an alternate arrangement of the 6 north and south poles is mounted on a rotor yoke 1 in an opposing relationship to a stator yoke 5 with an air gap 4 left therebetween and with a pair of coreless armature coils 3 disposed in the air gap 4. In the motor of FIG. 1, the stator yoke 5 has at a face thereof opposing the field magnet 2 two inclined surfaces which thus define the complementarily inclined air gap 4. This method, however, has a drawback that the efficiency is relatively low because the air gap is relatively great.

Referring now to FIG. 2, another method is illustrated. In the motor of FIG. 2, a stator yoke 5 has no such inclined faces as provided on the stator yoke 5 of FIG. 1. Instead, an iron bar 6 is mounted on the stator yoke 5 and extends through each of a pair of coreless armature coils 3 disposed in a uniform air gap 4 defined by the stator yoke 5 and a field magnet 2 on a rotor yoke 1. According to this arrangement, a magnetic flux will appear as seen in FIG. 3 and hence the field magnet 2 will stop at a position in which the iron bars 6 are each opposed to the center of one of the N and S poles of the field magnet 2. Accordingly, if the armature coils 3 are located so as to produce a rotational torque in such a stopping position of the field magnet 2, a coreless motor which can start itself will be obtained.

However, the method as shown in FIG. 2 has a drawback that if the thickness of the iron bars 6 is increased in order to increase the cogging torque, the torque around the dead points will decrease because a magnetic flux 7 will act as shown in FIG. 4 around the dead points.

SUMMARY OF THE INVENTION

It is an object of the present invention to provide a 1-phase energized disk-type brushless motor which can provide a cogging torque showing an ideal torque-angular rotor displacement curve having a sufficient magnitude.

It is another object of the invention to provide a 1-phase energized disk-type brushless motor which has a built-in energization controlling circuit for controlling the motor.

In order to attain the objects, according to the present invention, a 1-phase energized disk-type brushless motor comprises a magnet rotor having 2p-poles (p is an integer equal to or greater than 1) with magnetic north and south poles arranged in an alternate relationship and a stator armature including one or more armature coils disposed in an opposing face-to-face relationship to the magnet rotor. Each of the armature coils has a pair of magnetically active conductor portions which contribute to generation of a torque and include a width substantially equal to the width of each pole of the magnet rotor. A printed circuit board is provided, on which the armature coils are located separately from each other. The invention further includes a single position detecting element and a substantially sector-shaped cogging generating magnetic plate having a width substantially equal to the width of each pole of the magnet rotor. The cogging generating magnetic plate is secured to and located on the printed circuit board such that the radial center line between the width thereof is spaced, in a direction opposite to the direction of rotation of the magnet rotor, by about three fourths of the width of each pole of the magnet rotor from one of the magnetically active conductor portions of one of the armature coils, whereby electric parts of an energization controlling circuit for controlling the motor can be located at a portion on the printed circuit board which does not oppose the magnetic plate.

Accordingly, since the 1-phase energized disk-type brushless motor can start itself without failure even when it is equipped merely with a single position detecting element, various disk-type brushless motors including high performance fan motors can be produced at a relatively low cost. Besides, since the motor can start itself with such a single position detecting element and there is no need of provision of a stator yoke uniformly on a lower face of a stator armature, electric parts of an energization controlling circuit can be installed easily at a portion on a printed circuit board at which neither a cogging generating magnetic member, nor an armature coil is located. Accordingly, inexpensive, small 1-phase energized disk-type brushless motors including fan motors having a built-in energization controlling circuit can be, mass produced.

DESCRIPTION OF THE PREFERRED EMBODIMENTS

Figure 1:
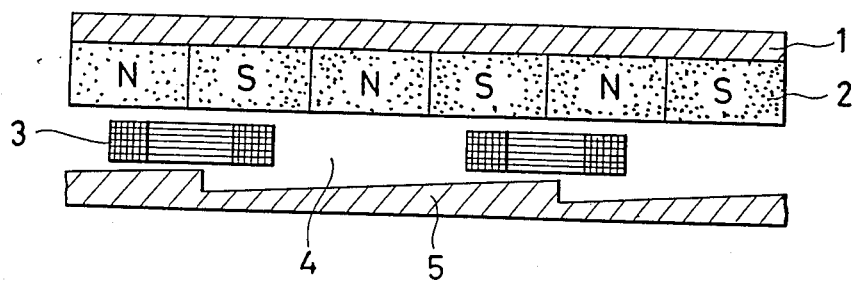
FIG. 1 is a developed illustrative view of a rotor and a stator of a 1-phase energized coreless-type brushless motor illustrating a conventional means for generating a cogging torque.
Figure 2:
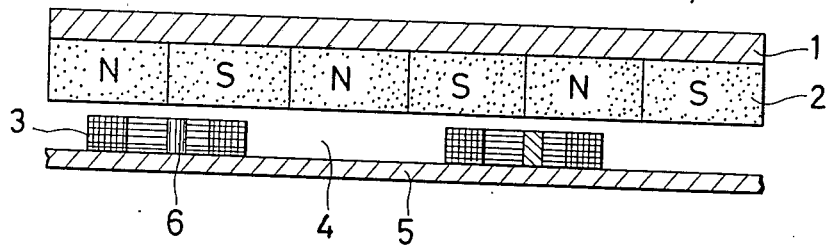
FIG. 2 is a similar view but illustrating another conventional means for generating a cogging torque.
Figures 3, 4:
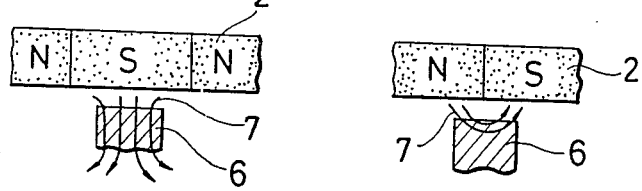
FIG. 3 is an illustrative view of part of the motor of FIG. 2 illustrating a stopping position of the rotor.
FIG. 4 is a similar view illustrating a magnetic flux around a dead point of the motor of FIG. 2.
Figure 5:
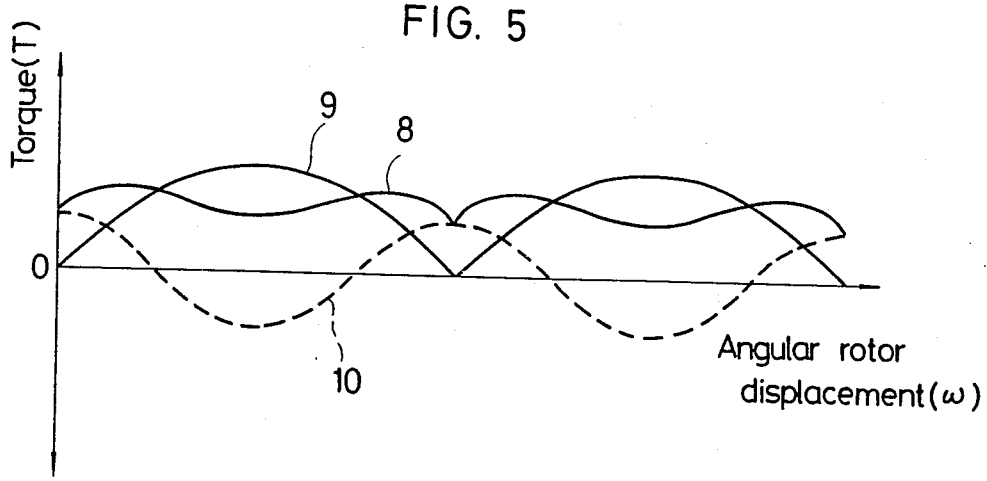
FIG. 5 is a graph showing a torque-angular rotor displacement curve of a 1-phase energized disk-type brushless motor according to the present invention.

In order to obtain an ideal torque-angular rotor displacement curve, it is necessary to obtain a composite torque curve 8 as shown in FIG. 5. In FIG. 5, an armature coil torque curve by an armature coil is indicated by a curve 9, while a cogging torque curve by a cogging generating magnetic member is indicated by a curve 10. As is apparent from the armature coil torque curve 9 and the cogging torque curve 10, the cogging torque should be a half the magnitude of the armature torque. By this, the torque curve 8, which is a composite of the armature coil torque and the cogging torque, exhibits a substantially uniform rotational torque over the entire range of rotation.

In order to obtain such an ideal composite torque curve 8, a cogging magnetic member must be designed correctly in size and location, and the present invention can provide such an ideal composite torque curve 8.

Now, a disk-type brushless motor according to a first embodiment of the invention will be described with reference to FIGS. 6 to 11. The motor shown is constructed as a 1-phase disk-type brushless fan motor having a single position detecting element, two coils and a magnet rotor having 4 poles, but otherwise if the motor has only one coil, it can be driven in a similar principle.

Figure 6:
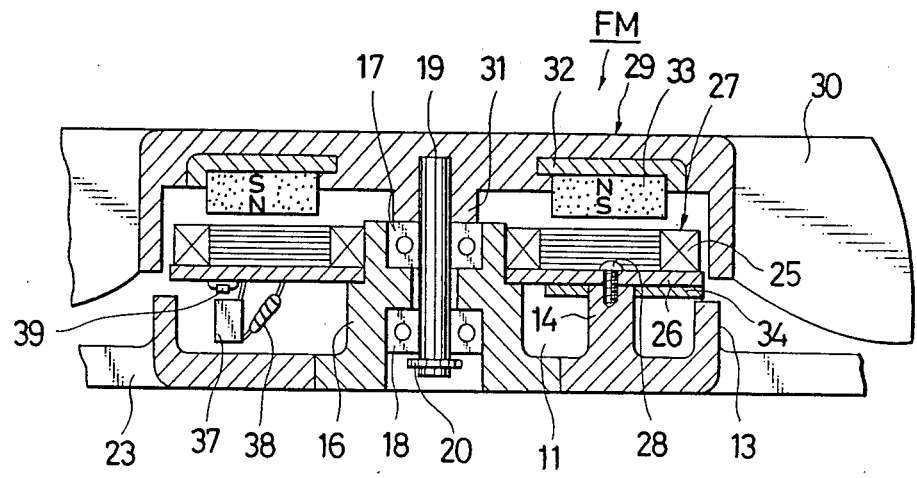
FIG. 6 is a vertical sectional view of a disk-type brushless fan motor according to a first embodiment of the invention.
Figure 7:
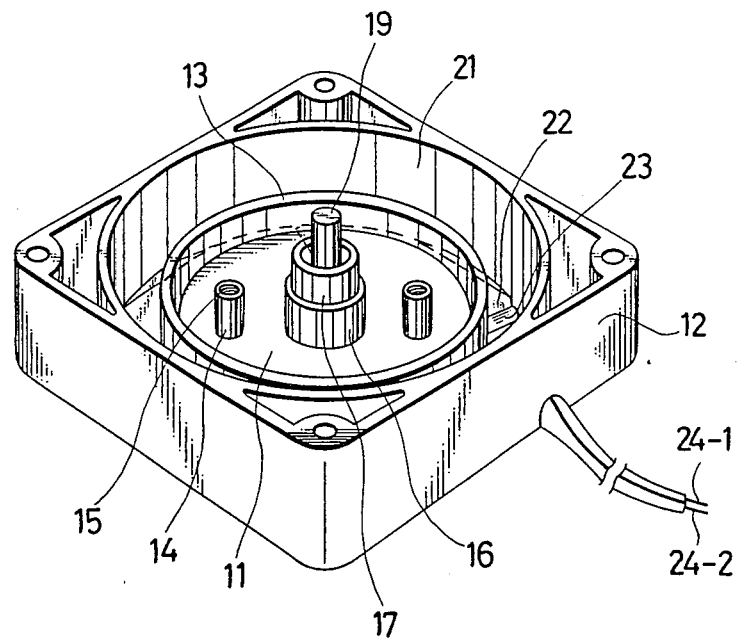
FIG. 7 is a perspective view, in a somewhat reduced scale, of a case of the fan motor of FIG. 6.

Referring first to FIGS. 6 and 7, the disk-type brushless fan motor generally designated at FM includes an angular case 12 which is made of, for example, a plastic material and is generally flattened in its axial direction. The case 12 has, at a central portion thereof, an integral, generally cup-shaped motor casing 13 defining therein a recessed spacing 11. The recessed spacing 11 of the motor casing 13 can accommodate therein electric parts of an energization controlling circuit as hereinafter described, which allows disk-type brushless motors or disk-type brushless fan motors to be produced with good performance and with simplified mass-production steps at a reduced cost.

A pair of posts 14 are formed integrally on and extend uprightly from the bottom of the casing 13 and each have a threaded hole 15 formed at the top thereof. A bearing housing or hub 16 is formed at the center of, and also extends uprightly from, the bottom of the casing 13, and a pair of journal bearings 17, 18 are located in a pair of openings at the upper and lower ends of the bearing housing 16. A rotary shaft 19 extends through a center bore of the bearing housing 16 and is supported for rotation substantially at the center of the disk-type brushless fan motor FM by means of the journal bearings 17, 18. An E-snap ring 20 is mounted adjacent the bottom end of the rotary shaft 19 so that the shaft 19 may not be pulled off upwardly.

A spacing 21 is formed between the case 12 and the casing 13, and the case 12 and the casing 13 are interconnected by means of stays 23 with air inlet windows 22 left therebetween. A positive power code 24-1 and a negative power code 24-2 extend from the case 12 for electric connection with an external power supply.

A stator armature 27 is composed of a pair of armature coils 25 mounted on an upper face of a printed circuit board 26 and is securely mounted at the top of the posts 14 by means of screws 28 made of a nonmagnetic material and screwed into the threaded holes 15 at the top of the posts 14 by way of perforations 36 formed in the printed circuit board 26. The armature coils 25-1, 25-2 are located at positions of indentical phase in a symmetrical relationship relative to the center of the printed circuit board 26 and hence of the motor FM, or in other words, in an angularly displaced relationship by 180° around the center of the motor FM, as seen in FIG. 9.

Figure 8:
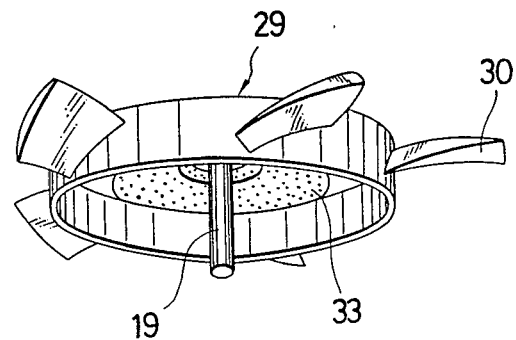
FIG. 8 is a perspective view of a cup member with fan blades of FIG. 6.

Above the stator armature 27, a cup member 29 is mounted for rotation in a parallel opposing relationship. The cup member 29 is made of a plastic material and is generally flattened in an axial direction thereof as seen in FIG. 8, and has several fan blades 30 integrally formed on an outer periphery thereof. A hub 31 is integrally formed substantially at the center of an inner or lower face of the cup member 29, and the rotary shaft 19 is securely fitted in the hub 31 of the cup member 29 for integral rotation with the latter. An annular rotor yoke 32 is securely mounted on the inner face of the cup member 29. An annular 4-pole magnet rotor 33 having four alternate N and S magnet poles as shown in FIG.

10 is securely mounted on a lower face of the rotor yoke 32 in an opposing relationship to the stator armature 27.

Figure 9:
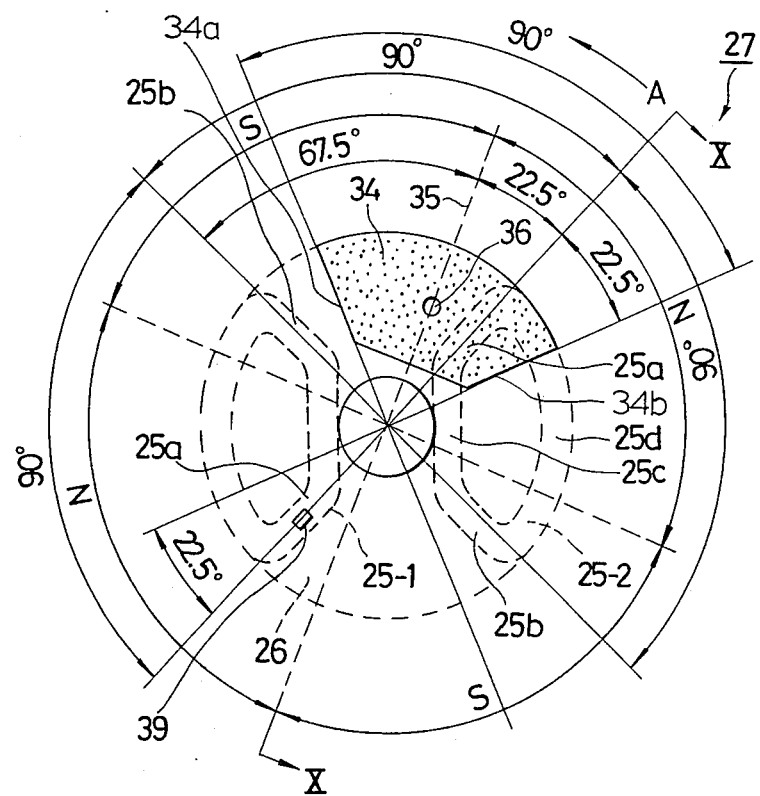
FIG. 9 is a bottom plan view of a stator armature of the embodiment of FIG. 6.
Figure 10:
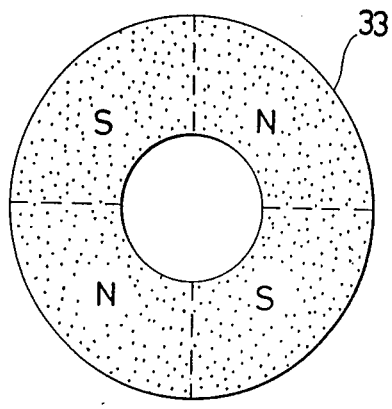
FIG. 10 is a plan view of a 4-pole magnet rotor.

The two coreless armature coils 25-1, 25-2 are located at spaced symmetrical positions on a face of the printed circuit board 26 opposing the magnet rotor 33 as described above and are approximately sector-shaped such that magnetically effective conductor portions 25a and 25b thereof, which contribute to generation of a torque, include a width substantially equal to the width of each pole of the magnet rotor 33, as shown in FIG. 9. A cogging (reluctance) generating magnetic plate 34, made of an iron plate or the like, is secured, for example, by adhesion, to a lower face of the printed circuit board 26. In particular, referring to FIG. 9, the magnetic plate 34 is approximately sector-shaped, in plan, having angular edges 34A, 34B spaced angularly by a width substantially equal to the width of each magnet pole of the magnet rotor 33, that is, a width of 90° because the magnet rotor 33 has 4 magnet poles. The magnetic plate 34 is fixed, for example, by adhesion, on the printed circuit board 26 such that the radial center line 35 between the width thereof is displaced in a direction opposite to the direction of rotation of the magnet rotor 33 (the direction indicated by an arrow A in FIG. 9), by three fourths of the width of each pole of the magnet rotor 33, that is, by an angle of 67.5°, from one of the magnetically active conductor portion 25a, 25b of the armature coil 25-1 (which may be otherwise 25-2 or else both 25-1 and 25-2). The cogging generating magnetic plate 34 has a perforation 36 formed therein so that the screw 28 may extend therethrough.

Electronic parts of an energization controlling circuit such as a transistor 37 and a resistor 38 are located at a portion of the lower face of the printed circuit board 26 of the stator armature 27 other than the portion opposing the cogging generating magnetic plate 34 and the portions opposing the armature coils 25-1, 25-2, as seen in FIG. 6. Meanwhile, a magnetoelectric transducer element 39, such as a Hall element or a Hall IC used as a position detecting element, is located just below the magnetically effective conductor portion 25a of the armature coil 25-1.

It is to be noted here that since circumferentially extending conductor portions 25c, 25d of the armature coils 25-1, 25-2 do not contribute to generation of a torque, the magnet rotor 33 may have a smaller outer radius by the width (radial dimension) of the outer conductor portion 25d. It is also to be noted that the magnetically effective conductor portions 25a and 25b of the armature coils 25-1, 25-2 include an angle of 90° because the magnet rotor 33 has 4-poles as described above. Further, while in the motor FM as shown two armature coils 25-1, 25-2 are located in symmetrical positions in order to obtain the necessary torque and to ensure good rotational balance, namely to reduce rotational vibrations and thus minimize rotational noise, a single armature coil may otherwise be included in the motor.

Figure 11:
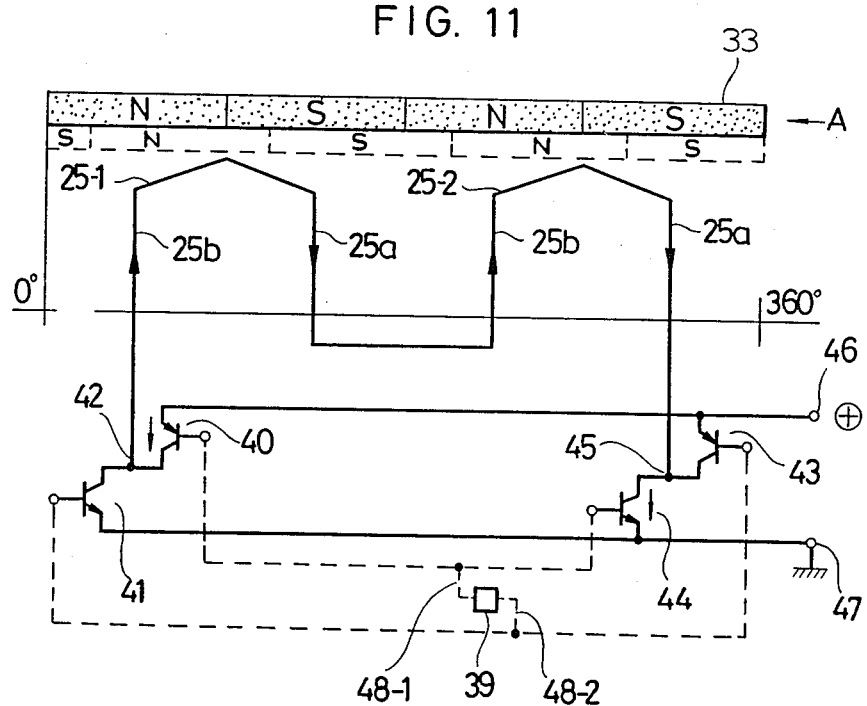
FIG. 11 is a developed view of the magnet rotor of FIG. 10 and the stator armature of FIG. 9.

When the cogging generating magnetic plate 34 is arranged on the lower face of the printed circuit board 26 of the stator armature 27 under the above-described conditions, namely, at such a position as shown in FIG. 9, the magnet rotor 33 and stator armature 27 oppose each other in such a relationship as indicated by the letters N,S along the outer periphery of the stator armature 27 in FIG. 9, in other words, the magnet rotor 33 indicated by dashed lines and the stator armature 27 (the armature coils 25-1,25-2) oppose each other as shown in FIG. 11 when no current is fed, namely, at the time of a stop or start-up. Namely, the magnet rotor 33 and stator armature 27 stop at positions where the cogging generating magnetic plate 34 and the magnet rotor 33 are magnetically balanced.

Accordingly, at the time of a start-up, the magnetoelectric transducer 39 always detects an N or S pole of the magnet rotor 33 and hence does not detect a dead point, and therefore, the magnet rotor 33 can be rotated continuously in a predetermined direction if the armature coil 25-1 or 25-2 is suitably energized by electric current flow in a predetermined direction.

Although the provision of the cogging generating magnetic plate 34 on the printed circuit board 26 will cause generation of cogging, according to the present invention, such cogging of the magnetic plate 34 is effectively utilized to attain continuous rotation of the motor. Accordingly, only one position detecting element is required for the motor, and as a result, an inexpensive 1-phase energized disk-type brushless motor or disk-type brushless fan motor can be obtained.

It is to be noted that while the magnetic plate 34 mounted on the printed circuit board 26 is provided to allow self-starting of the rotor at any time, the size and shape thereof are such that the magnetic plate 34 is in an opposing face-to-face relationship to equal the areas of two adjacent N and S poles of the magnet rotor 33 while assuring such self-starting of the rotor 33.

Reference is now had to FIG. 11 which is a developed view of the magnet rotor 33 and the stator armature 27 in the 4-pole, 2-coil, 1-phase reciprocally energized brushless (fan) motor. The magnetically effective conductor portions 25a, 25b of the armature coils 25-1, 25-2 which contribute to generation of a torque are located in an equidistantly spaced relationship by an electrical angle of 180° (which correspond to a mechanical angle of 90° in the present embodiment). One of two terminals of the magnetically effective conductor portion 25a of the armature coil 25-1 and the other of terminals of the magnetically effective conductor portion 25a of the armature coil 25-2 are connected in common while the other of terminals of the magnetically effective conductor portion 25b of the armature coil 25-1 is connected to a junction point 42 between the collector of a transistor 40 and the emitter of another transistor 41 both of the energization controlling circuit, and one of the terminals of the magnetically active conductor portion 25a of the armature coil 25-2 is connected to a junction point 45 between the collector of a transistor 43 and the emitter of another transistor 44. The energization controlling circuit is constructed as a 1-phase reciprocating energization controlling circuit. The emitters of the transistors 40, 44 are connected to a positive power supply terminal 46 while the emitters of the transistors 41, 45 are grounded as at 47.

Output terminals 48-1, 48-2 of the magnetoelectric transducer 39 serving as a position detecting element are connected to the energization controlling circuit. Accordingly, if the position detecting element 39 detects an N pole of the magnet rotor 33, a signal is coupled from the output terminal 48-1 of the position detecting element 39 to render the transistors 40, 44 conductive to cause electric current flow in directions indicated by respective arrow marks through the armature coils 25-1, 25-2. As a result, a turning force in a direction indicated by an arrow mark A is produced (see FIGS. 9 and 11). On the contrary, if the magnetoelectric transducer 39 detects an S pole of the magnet rotor 33, a signal is coupled from the output terminal 48-2 of the position detecting element 39 to render the transistors 41, 43 conductive and cause electric current flow in directions opposite to the directions indicated by the respective arrow marks through the armature coils 25-1, 25-2. As a result, a turning force in the direction indicated by the arrow mark A is produced again.

Figure 12:
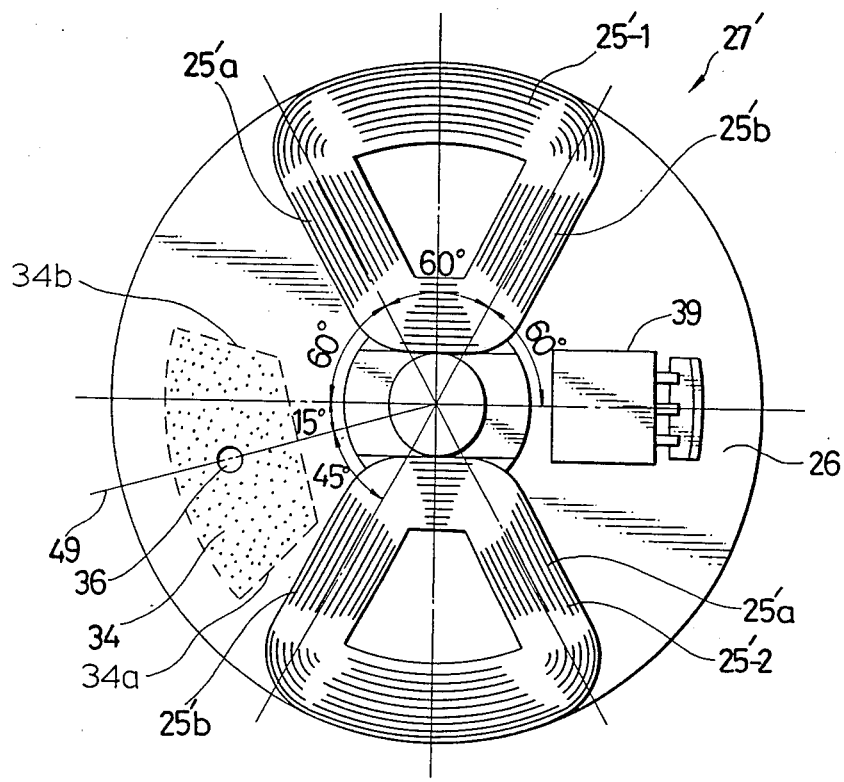
FIG. 12 is a plan view of a disk-type brushless motor according to a second embodiment of the invention.
Figure 13:
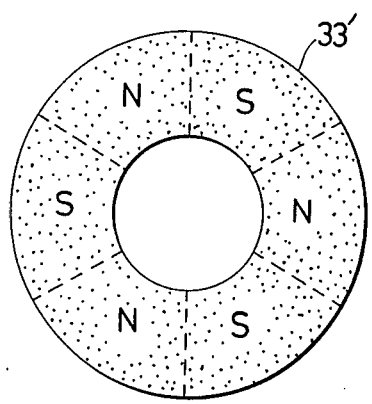
FIG. 13 is a bottom plan view of a 6-pole magnet rotor.

A second embodiment of the present invention will now be described with reference to FIGS. 12 to 14. FIG. 12 is a plan view of a stator armature 27' in which a 6-pole annular magnet rotor 33' of FIG. 13 is used. Armature coils 25'-1, 25'-2 are approximately sector-shaped, and the magnetically effective conductor portions 25'a, 25'b which contribute to generation of a torque include a width of 60°. The armatures 25'-1, 25'-2 are located in a symmetrical relationship at two displaced positions spaced by an angle of 180° on a printed circuit board 26. A cogging generating magnetic plate 34 having a width of 60° is securely mounted on an lower face of the printed circuit board 26 and located at such a position that the widthwise center line 49 thereof is spaced by three fourths of the width of each pole of the magnet rotor 33', that is, at a point in a direction opposite to the direction of rotation of magnet rotor 33', from the magnetically effective conductor portion 25'b of the armature coil 25'-2, as seen from FIG. 12.

A magnetoelectric transducer element 39 is located at a mid position between the magnetically effective conductor portion 25'b of the armature coil 25'-1 and the magnetically effective conductor portion 25'a of the armature coil 25'-2 on the printed circuit board 26. When the magnetoelectric transducer element 39 serving as a position detecting element is located at such a specific position on the printed circuit board 26 as described above, the magnetic plate 34 is not located at a position on the printed circuit board 26 opposing the magnetoelectric transducer element 39. Accordingly, terminals of the element 39 can be projected and soldered to the bottom face of the printed circuit board 26.

Figure 14:
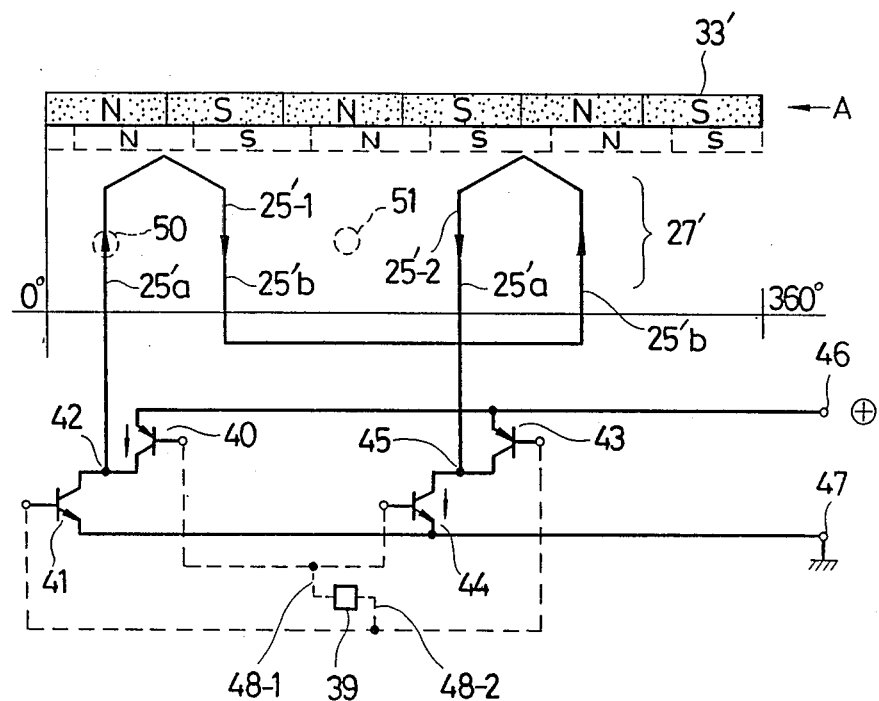
FIG. 14 is a developed view of a stator armature of FIG. 12 and the magnet rotor of FIG. 13.

FIG. 14 is a developed view of the magnet rotor 33' and the stator armature 27'. As seen in FIG. 14, the magnetoelectric transducer element 39 which should be located at a position, for example, indicated by a circle 50 of a broken line, on the printed circuit board 26 opposing the magnetically effective conductor portion 25'a of the armature coil 25'-1 is here located at a corresponding same phase position on the printed circuit board 26 as is indicated by another broken line circle 51 (also refer to FIG. 12).

It is to be noted that, while the motor of either of the embodiments described above includes a 4- or 6-pole magnet rotor 33 or 33' and two armature coils 25-1, 25-2 or 25'-1, 25'-2, it may otherwise include a single armature coil.

Further, where a 6-pole magnet rotor 33' is employed, three armature coils may be disposed in an equidistantly spaced relationship. Otherwise, where an 8-pole magnet rotor is used, four armature coils may be disposed in an equidistantly spaced relationship.

What is claimed is:

1. A 1-phase energized disk-type brushless motor, comprising: a magnet rotor having 2p-poles (p is an integer equal to or greater than 1) with magnetic north and south poles arranged in an alternate relationship; a printed circuit board provided on a stationary side at a position opposing the magnet rotor with an axial gap between the printed circuit board and a surface of the magnet rotor; a stator armature including one or more armature coils having a width substantially equal to the width of each pole of said magnet rotor and disposed on a surface of the printed circuit board at a position of an identical phase, said surface of the printed circuit board opposing said magnet rotor; a single position detecting element provided with the stator armature at a position of a phase identical to magnetically effective conductor portions of each of the armature coils, said conductor portions contributing to the generation of a torque; a cogging generating magnetic plate having between both angular edges thereof an angular width substantially equal to the width of each pole of said magnet rotor and arranged on said printed circuit board such that an angular center line thereof is spaced by about three fourths of the width of each pole of said magnet rotor from one of said magnetically effective conductor portions of one of said armature coils in a direction opposite to the direction of rotation of the magnet rotor, whereby electric parts of an energization controlling circuit for controlling said motor are arranged on said printed circuit board in such a way that terminals of the electric parts do not oppose said magnetic plate.

2. A 1-phase energized disk-type brushless motor according to claim 1, wherein said one of said magnetically effective conductor portions of one of said armature coils in the trailing one of said magnetically effective conductor portions relative to the direction of rotation of said magnet rotor.

3. A 1-phase energized disk-type brushless motor according to claim 1, wherein said position detecting element is located at a position on one face of said printed circuit board just opposing one of said magnetically effective conductor portions of one of said armature coils which are mounted on the other face of said printed circuit board.

4. A 1-phase energized disk-type brushless motor according to claim 3, wherein said position detecting element and said cogging generating magnetic plate are located on opposite sides relative to the center of rotation of said magnet rotor.

5. A 1-phase energized disk-type brushless motor, comprising: a cup-shaped fan member having a plurality of fan blades on an outer periphery thereof; a magnet rotor secured to said fan member and having 2p-poles (p is an integer equal to or greater than 1) with magnetic north and south poles arranged in an alternate relationship; a printed circuit board provided on a stationary side at a position opposing the magnet rotor with an axial gap left between the printed circuit board and a surface of the magnet rotor; a stator armature including one or more armature coils having a width substantially equal to the width of each pole of said magnet rotor and disposed on a surface of the printed circuit board at a position of an identical phase, said surface of the printed circuit board opposing said magnet rotor; a single position detecting element provided with the stator armature at a position of a phase identical to magnetically effective conductor portions of each of the armature coils, said conductor portions contributing to the generation of a torque; a substantially sector-shaped cogging generating magnetic plate having between both angular edges thereof an angular width substantially equal to the width of each pole of said magnet rotor and arranged on said printed circuit board such that an angular center line thereof is spaced by about three fourths of the width of each pole of said magnet rotor from one of said magnetically effective conductor portions of one of said armature coils in a direction opposite to the direction of rotation of the magnet rotor, whereby electric parts of an energization controlling circuit for controlling said motor are arranged on said printed circuit board in such a way that terminals of the electric parts do not oppose said magnetic plate.

* * * * *